(12) United States Patent
    Gong

(10) Patent No.: US 10,388,240 B2
(45) Date of Patent: Aug. 20, 2019

(54) GATE DRIVER ON ARRAY CIRCUIT AND IN-CELL TOUCH DISPLAY PANEL

(71) Applicant: WUHAN CHINA STAR OPTOELECTRONICS TECHNOLOGY CO., LTD., Wuhan, Hubei (CN)

(72) Inventor: Qiang Gong, Hubei (CN)

(73) Assignee: Wuhan China Star Optoelectronics Technology Co., Ltd., Wuhan, Hubei (CN)

(*) Notice: Subject to any disclaimer, the term of this patent is extended or adjusted under 35 U.S.C. 154(b) by 27 days.

(21) Appl. No.: 15/742,211

(22) PCT Filed: Dec. 28, 2017

(86) PCT No.: PCT/CN2017/119414
§ 371 (c)(1),
(2) Date: Jan. 5, 2018

(65) Prior Publication Data
US 2019/0164514 A1 May 30, 2019

(30) Foreign Application Priority Data
Nov. 27, 2017 (CN) .......................... 2017 1 1203306

(51) Int. Cl.
G09G 3/36 (2006.01)
G06F 3/041 (2006.01)

(52) U.S. Cl.
CPC ......... *G09G 3/3655* (2013.01); *G06F 3/0412* (2013.01); *G09G 3/3677* (2013.01); *G09G 2310/0243* (2013.01); *G09G 2310/0267* (2013.01); *G09G 2310/0283* (2013.01)

(58) Field of Classification Search
CPC .............. G09G 3/3655; G09G 3/3677; G09G 2310/0243; G09G 2310/0267; G09G 2310/0283; G09G 3/36; G09G 2310/0264; G06F 3/0412; G02F 1/13338; G02F 1/13306; H01L 27/1214
See application file for complete search history.

(56) References Cited

U.S. PATENT DOCUMENTS

2017/0092214 A1* 3/2017 Xiao .................... G09G 3/3677
2017/0102805 A1* 4/2017 Xiao .................... G06F 3/0412
2017/0148401 A1* 5/2017 Zhao .................... G09G 3/3648

* cited by examiner

*Primary Examiner* — Lunyi Lao
*Assistant Examiner* — Jarurat Suteerawongsa
(74) *Attorney, Agent, or Firm* — Muncy, Geissler, Olds & Lowe, P.C.

(57) ABSTRACT

The present disclosure proposes an in-cell touch display panel and a gate driver on array (GOA) circuit. A pre-charging circuit is arranged on an nth stage GOA unit circuit of the GOA circuit and the in-cell touch display panel. A first node controlling signal on a first node of an (n+2)th stage GOA unit circuit is pre-charged, reducing a risk of failure of stage-by-stage signal transmitting arising from poor holding voltage of the GOA unit circuit during the signal suspending and improving reliability of the GOA circuit.

20 Claims, 4 Drawing Sheets

GATE DRIVER ON ARRAY CIRCUIT AND IN-CELL TOUCH DISPLAY PANEL

BACKGROUND

1. Field of the Disclosure

The present disclosure relates to the field of a liquid crystal display, and more particularly, to a gate driver on array (GOA) circuit and an in-cell touch display panel.

2. Description of the Related Art

The gate driver on array (GOA) technique is that a gate-scanning driving circuit is formed in a thin-film transistor (TFT) array substrate according to a TFT liquid-crystal display (LCD) array process, and the gate-scanning driving circuit is scanned row by row with the GOA technique.

With the development of the integrated touch panel, the display panel is usually arranged in an in-cell touch display panel. In the in-cell touch display panel, the time of display refreshment is separated to spare time (signal suspending) to touch-scan the panel. The operating state of the GOA circuit of the panel no longer succeeds; instead, the GOA circuit with a certain number of stages is scanned each time, maintains for a period of time, and continues to be scanned. Therefore, when the GOA circuit stays the maintaining state, the maintaining stability of the GOA circuit tends to be not enough, resulting in cascade failure of the GOA circuit and abnormal display.

SUMMARY

An object of the present disclosure is to propose a gate driver on array (GOA) circuit and an in-cell touch display panel to reduce the risk of cascade failure and stabilize the GOA circuit when the maintaining stability of the GOA circuit is not enough in the signal suspending.

According to the present disclosure, a gate driver on array (GOA) circuit applying to an in-cell touch display panel comprises:

a plurality of cascaded GOA unit circuits; an nth stage GOA unit circuit comprising: a forward/reverse-scanning controlling circuit, a node controlling circuit, an output circuit, an output controlling circuit, and a pre-charging circuit;

the forward/reverse-scanning controlling circuit, configured to output a first node controlling signal at a first node and a second node controlling signal at a second node according to a forward-scanning direct current controlling signal and a reverse-scanning direct current controlling signal;

the node controlling circuit, coupled to the first node and the second node, and configured to pull the first node controlling signal down to a constant-voltage low voltage level and raise the second node controlling signal to a constant-voltage high voltage level;

the output circuit, coupled to the first node and electrically connected to a first clock signal, and configured to output a scanning signal according to the first node controlling signal and the first clock signal;

the output controlling circuit, electrically connected to the first controlling signal and configured to pull the scanning signal down to the constant-voltage low voltage level according to the first controlling signal;

the pre-charging circuit, coupled to the first node and electrically connected to the first node of an (n+2)th stage GOA unit circuit, configured to pre-charge the first node controlling signal on the first node of the (n+2)th stage GOA unit circuit when the in-cell touch display panel is under a stage of signal suspending and touch scanning;

the pre-charging circuit comprises a first third thin-film transistor (TFT) and a second TFT;

a gate and a source of the first TFT being both connected to the first node; a drain of the first TFT being connected to a source of the second TFT, a drain of the second TFT being connected to the first node of the (n+2)th stage GOA unit circuit; a gate of the second TFT receiving the first controlling signal;

when the in-cell touch display panel displays normally, the first controlling signal being at a low voltage level; when the in-cell touch display panel is under the stage of signal suspending and touch scanning, the first controlling signal being at a high voltage level.

In one aspect of the present disclosure, the forward/reverse-scanning controlling circuit comprises a third TFT, a fourth TFT, a fifth TFT, a first capacitor, and a second capacitor;

a source of the third TFT receives the forward-scanning direct current controlling signal; a gate of the third TFT receives the scanning signal of an (n−2)th stage GOA unit circuit; a drain of the third TFT is connected to the first node, a drain of the fourth TFT, and the gate of the fifth TFT;

a source of the fourth TFT receives the reverse-scanning direct current controlling signal; a gate of the fourth TFT receives the scanning signal of the (n+2)th stage GOA unit circuit;

a source of the fifth TFT receives the constant-voltage low voltage level; a drain of the fifth TFT is connected to the second node;

a terminal of the first capacitor is connected to the first node; the other terminal of the first capacitor receives the constant-voltage low voltage level.

a terminal of the second capacitor is connected to the second node; the other terminal of the second capacitor receives the constant-voltage low voltage level.

In another aspect of the present disclosure, the node controlling circuit comprises a sixth TFT, a seventh TFT, an eighth TFT, and a ninth TFT;

a source of the sixth TFT receives a second clock signal; a gate of the sixth TFT receives the forward-scanning direct current controlling signal; a drain of the sixth TFT is connected to a gate of the eighth TFT;

a source of the seventh TFT receives a third clock signal; a gate of the seventh TFT receives the reverse-scanning direct current controlling signal; a drain of the seventh TFT is connected to the gate of the eighth TFT;

a source of the eighth TFT receives the constant-voltage high voltage level; a drain of the eighth TFT is connected to the second node;

a source of the ninth TFT receives the constant-voltage low voltage level; a gate of the ninth TFT is connected to the second node; a drain of the ninth TFT is connected to the first node.

In still another aspect of the present disclosure, the output circuit comprises a tenth TFT;

a source of the tenth TFT receives the first clock signal; a gate of the tenth TFT is connected to the first node; a drain of the tenth TFT is connected to an output terminal of the output circuit.

In still another aspect of the present disclosure, the output controlling circuit comprises an eleventh TFT and a twelfth TFT;

a source of the eleventh receives the constant-voltage low voltage level; a gate of the eleventh TFT is connected to the second node; a drain of the eleventh TFT is connected to the output terminal of the output circuit;

a source of the twelfth TFT receives the constant-voltage low voltage level; a gate of the twelfth TFT receives the first controlling signal; a drain of the twelfth TFT is connected to the output terminal of the output circuit.

In still another aspect of the present disclosure, the nth stage GOA unit circuit further comprises a reset circuit; the reset circuit comprises a thirteenth TFT; a source and a drain of the thirteenth TFT both receive a reset signal; a drain of the thirteenth TFT is electrically connected to the second node.

In still another aspect of the present disclosure, the forward-scanning direct current controlling signal is at high voltage level, and the reverse-scanning direct current controlling signal is at low voltage level when the GOA circuit is scanned forwardly; the forward-scanning direct current controlling signal is at low voltage level, and the reverse-scanning direct current controlling signal is at high voltage level when the GOA circuit is scanned reversely.

According to the present disclosure, a gate driver on array (GOA) circuit, applying to an in-cell touch display panel comprises:

a plurality of cascaded GOA unit circuits; an nth stage GOA unit circuit comprising: a forward/reverse-scanning controlling circuit, a node controlling circuit, an output circuit, an output controlling circuit, and a pre-charging circuit;

the forward/reverse-scanning controlling circuit, configured to output a first node controlling signal at a first node and a second node controlling signal at a second node according to a forward-scanning direct current controlling signal and a reverse-scanning direct current controlling signal;

the node controlling circuit, coupled to the first node and the second node, and configured to pull the first node controlling signal down to a constant-voltage low voltage level and raise the second node controlling signal to a constant-voltage high voltage level;

the output circuit, coupled to the first node and electrically connected to a first clock signal, and configured to output a scanning signal according to the first node controlling signal and the first clock signal;

the output controlling circuit, electrically connected to the first controlling signal and configured to pull the scanning signal down to the constant-voltage low voltage level according to the first controlling signal;

the pre-charging circuit, coupled to the first node and electrically connected to the first node of an (n+2)th stage GOA unit circuit, configured to pre-charge the first node controlling signal on the first node of the (n+2)th stage GOA unit circuit when the in-cell touch display panel is under a stage of signal suspending and touch scanning.

In one aspect of the present disclosure, the pre-charging circuit comprises a first third thin-film transistor (TFT) and a second TFT;

a gate and a source of the first TFT being both connected to the first node; a drain of the first TFT being connected to a source of the second TFT, a drain of the second TFT being connected to the first node of the (n+2)th stage GOA unit circuit; a gate of the second TFT receiving the first controlling signal.

In another aspect of the present disclosure, the forward/reverse-scanning controlling circuit comprises a third TFT, a fourth TFT, a fifth TFT, a first capacitor, and a second capacitor;

a source of the third TFT receives the forward-scanning direct current controlling signal; a gate of the third TFT receives the scanning signal of an (n−2)th stage GOA unit circuit; a drain of the third TFT is connected to the first node, a drain of the fourth TFT, and the gate of the fifth TFT;

a source of the fourth TFT receives the reverse-scanning direct current controlling signal; a gate of the fourth TFT receives the scanning signal of the (n+2)th stage GOA unit circuit;

a source of the fifth TFT receives the constant-voltage low voltage level; a drain of the fifth TFT is connected to the second node;

a terminal of the first capacitor is connected to the first node; the other terminal of the first capacitor receives the constant-voltage low voltage level.

a terminal of the second capacitor is connected to the second node; the other terminal of the second capacitor receives the constant-voltage low voltage level.

In still another aspect of the present disclosure, the node controlling circuit comprises a sixth TFT, a seventh TFT, an eighth TFT, and a ninth TFT;

a source of the sixth TFT receives a second clock signal; a gate of the sixth TFT receives the forward-scanning direct current controlling signal; a drain of the sixth TFT is connected to a gate of the eighth TFT;

a source of the seventh TFT receives a third clock signal; a gate of the seventh TFT receives the reverse-scanning direct current controlling signal; a drain of the seventh TFT is connected to the gate of the eighth TFT;

a source of the eighth TFT receives the constant-voltage high voltage level; a drain of the eighth TFT is connected to the second node;

a source of the ninth TFT receives the constant-voltage low voltage level; a gate of the ninth TFT is connected to the second node; a drain of the ninth TFT is connected to the first node.

In still another aspect of the present disclosure, the output circuit comprises a tenth TFT;

a source of the tenth TFT receives the first clock signal; a gate of the tenth TFT is connected to the first node; a drain of the tenth TFT is connected to an output terminal of the output circuit.

In still another aspect of the present disclosure, the output controlling circuit comprises an eleventh TFT and a twelfth TFT;

a source of the eleventh receives the constant-voltage low voltage level; a gate of the eleventh TFT is connected to the second node; a drain of the eleventh TFT is connected to the output terminal of the output circuit;

a source of the twelfth TFT receives the constant-voltage low voltage level; a gate of the twelfth TFT receives the first controlling signal; a drain of the twelfth TFT is connected to the output terminal of the output circuit.

In still another aspect of the present disclosure, the nth stage GOA unit circuit further comprises a reset circuit; the reset circuit comprises a thirteenth TFT; a source and a drain of the thirteenth TFT both receive a reset signal; a drain of the thirteenth TFT is electrically connected to the second node.

In still another aspect of the present disclosure, when the in-cell touch display panel displays normally, the first controlling signal being at a low voltage level; when the in-cell touch display panel is under the stage of signal suspending and touch scanning, the first controlling signal being at a high voltage level.

In still another aspect of the present disclosure, the forward-scanning direct current controlling signal is at high voltage level, and the reverse-scanning direct current controlling signal is at low voltage level when the GOA circuit is scanned forwardly; the forward-scanning direct current controlling signal is at low voltage level, and the reverse-scanning direct current controlling signal is at high voltage level when the GOA circuit is scanned reversely.

According to the present disclosure, an in-cell touch display panel comprising a gate driver on array (GOA) circuit. The GOA circuit comprises:

a plurality of cascaded GOA unit circuits; an nth stage GOA unit circuit comprising: a forward/reverse-scanning controlling circuit, a node controlling circuit, an output circuit, an output controlling circuit, and a pre-charging circuit;

the forward/reverse-scanning controlling circuit, configured to output a first node controlling signal at a first node and a second node controlling signal at a second node according to a forward-scanning direct current controlling signal and a reverse-scanning direct current controlling signal;

the node controlling circuit, coupled to the first node and the second node, and configured to pull the first node controlling signal down to a constant-voltage low voltage level and raise the second node controlling signal to a constant-voltage high voltage level;

the output circuit, coupled to the first node and electrically connected to a first clock signal, and configured to output a scanning signal according to the first node controlling signal and the first clock signal;

the output controlling circuit, electrically connected to the first controlling signal and configured to pull the scanning signal down to the constant-voltage low voltage level according to the first controlling signal;

the pre-charging circuit, coupled to the first node and electrically connected to the first node of an (n+2)th stage GOA unit circuit, configured to pre-charge the first node controlling signal on the first node of the (n+2)th stage GOA unit circuit when the in-cell touch display panel is under a stage of signal suspending and touch scanning.

In one aspect of the present disclosure, the pre-charging circuit comprises a first third thin-film transistor (TFT) and a second TFT;

a gate and a source of the first TFT being both connected to the first node; a drain of the first TFT being connected to a source of the second TFT, a drain of the second TFT being connected to the first node of the (n+2)th stage GOA unit circuit; a gate of the second TFT receiving the first controlling signal.

In another aspect of the present disclosure, when the in-cell touch display panel displays normally, the first controlling signal being at a low voltage level; when the in-cell touch display panel is under the stage of signal suspending and touch scanning, the first controlling signal being at a high voltage level.

In still another aspect of the present disclosure, the forward-scanning direct current controlling signal is at high voltage level, and the reverse-scanning direct current controlling signal is at low voltage level when the GOA circuit is scanned forwardly; the forward-scanning direct current controlling signal is at low voltage level, and the reverse-scanning direct current controlling signal is at high voltage level when the GOA circuit is scanned reversely.

In contrast to prior art, a pre-charging circuit is arranged on an nth stage GOA unit circuit of the GOA circuit and the in-cell touch display panel. A first node controlling signal on a first node of an (n+2)th stage GOA unit circuit is pre-charged, reducing a risk of failure of stage-by-stage signal transmitting arising from poor holding voltage of the GOA unit circuit during the signal suspending and improving reliability of the GOA circuit.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF THE EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

Figure 1:
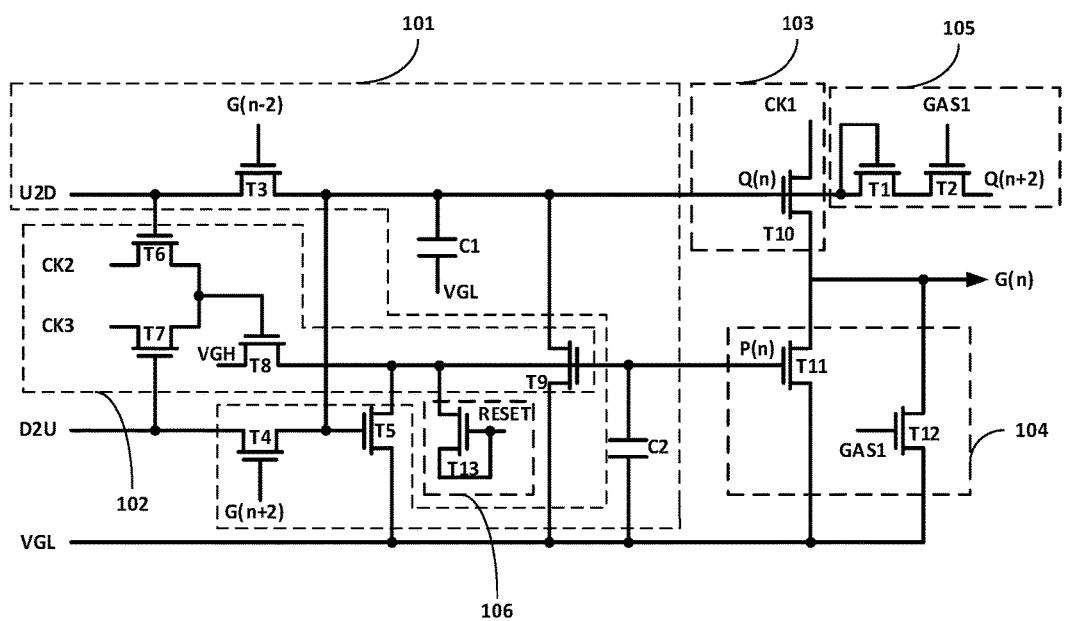
FIG. 1 illustrates a circuit diagram of a gate driver on array (GOA) circuit according to a first embodiment of the present disclosure.

Please refer to FIG. 1 illustrating a circuit diagram of a gate driver on array (GOA) circuit according to a first embodiment of the present disclosure. The GOA circuit includes a plurality of cascaded GOA unit circuits. An nth stage GOA unit circuit includes a forward/reverse-scanning controlling circuit 101, a node controlling circuit 102, an output circuit 103, an output controlling circuit 104, and a pre-charging 105. The nth stage GOA unit circuit does not include a first stage GOA unit circuit, a second stage GOA unit circuit, a second-last stage GOA unit circuit, and a last stage GOA unit circuit.

The forward/reverse-scanning controlling circuit 101 is configured to output a first node controlling signal at a first node Q(n) and a second node controlling signal at a second node P(n) according to a forward-scanning direct current controlling signal U2D and a reverse-scanning direct current controlling signal D2U.

The forward/reverse-scanning controlling circuit 101 includes a third thin-film transistor (TFT) T3, a fourth TFT T4, a fifth TFT T5, a first capacitor C1, and a second capacitor C2. A source of the third TFT T3 receives the forward-scanning direct current controlling signal U2D. A gate of the third TFT T3 receives a scanning signal G(n−2) of an (n−2)th stage GOA unit circuit. A drain of the third TFT T3 is connected to the first node Q(n), a drain of the fourth TFT T4, and a gate of the fifth TFT T5. A source of the fourth TFT T4 receives the reverse-scanning direct current controlling signal D2U. A gate of the fourth TFT T4 receives a scanning signal G(n+2) of the (n+2)th stage GOA unit circuit. A source of the fifth TFT T5 receives a constant-voltage low voltage level VGL. A drain of the fifth TFT T5 is connected to the second node P(n). A terminal of the first capacitor C1 is connected to the first node Q(n). The other terminal of the first capacitor C1 receives the constant-voltage low voltage level VGL. A terminal of the second capacitor C2 is connected to the second node P(n). The other terminal of the second capacitor C2 receives the constant-voltage low voltage level VGL.

The node controlling circuit 102 is coupled to the first node Q(n) and the second node P(n) and configured to pull the first node controlling signal down to the constant-voltage low voltage level VGL and raise the second node controlling signal to the constant-voltage high voltage level VGH.

The node controlling circuit 102 includes a sixth TFT T6, a seventh TFT T7, an eighth TFT T8, and a ninth TFT T9. A source of the sixth TFT T6 receives a second clock signal CK2. A gate of the sixth TFT T6 receives the forward-scanning direct current controlling signal U2D. A drain of the sixth TFT T6 is connected to a gate of the eighth TFT T8. A source of the seventh TFT T7 receives a third clock signal CK3. A gate of the seventh TFT T7 receives the reverse-scanning direct current controlling signal D2U. A drain of the seventh TFT T7 is connected to the gate of the eighth TFT T8. A source of the eighth TFT T8 receives the constant-voltage high voltage level VGH. A drain of the eighth TFT T8 is connected to the second node P(n). A source of the ninth TFT T9 receives the constant-voltage low voltage level VGL. A gate of the ninth TFT T9 is connected to the second node P(n). A drain of the ninth TFT T9 is connected to the first node Q(n).

The output circuit 103 is coupled to the first node Q(n) and electrically connected to the first clock signal CK1. The output circuit 103 is configured to output a scanning signal G(n) according to the first node controlling signal and the first clock signal CK1.

The output circuit 103 includes a tenth TFT T10. A source of the tenth TFT T10 receives the first clock signal CK1. A gate of the tenth TFT T10 is connected to the first node Q(n). A drain of the tenth TFT T10 is connected to an output terminal of the output circuit 103.

The output controlling circuit 104 is electrically connected to the first controlling signal GAS1 and configured to pull the scanning signal G(n) down to the constant-voltage low voltage level VGL according to the first controlling signal GAS1.

The output controlling circuit 104 includes an eleventh TFT T11 and a twelfth TFT T12. A source of the eleventh TFT T11 receives the constant-voltage low voltage level VGL. A gate of the eleventh TFT T11 is connected to the second node P(n). A drain of the eleventh TFT T11 is connected to the output terminal of the output circuit 103. A source of the twelfth TFT T12 receives the constant-voltage low voltage level VGL. A gate of the twelfth TFT T12 receives the first controlling signal GAS1. A drain of the twelfth TFT T12 is connected to the output terminal of the output circuit 103.

The pre-charging circuit 105 is coupled to the first node Q(n) and is electrically connected to a first node Q(n+2) of the (n+2)th stage GOA unit circuit. The pre-charging circuit 105 is configured to pre-charge the first node controlling signal on the first node Q(n+2) of the (n+2)th stage GOA unit circuit when the in-cell touch display panel goes to a stage of signal suspending and touch scanning.

The pre-charging circuit 105 includes a first TFT T1 and a second TFT T2.

A gate and a source of the first TFT T1 are both connected to the first node Q(n). A drain of the first TFT T1 is connected to a source of the second TFT T2. A drain of the second TFT T2 is connected to the first node Q(n+2) of the (n+2)th stage GOA unit circuit. A gate of the second TFT T2 receives the first controlling signal GAS1.

The nth stage GOA unit circuit further includes a reset circuit 106. The reset circuit 106 includes a thirteenth TFT T13. A source and a drain of the thirteenth TFT T13 receive a reset signal RESET. A drain of the thirteenth TFT T13 is electrically connected to the second node P(n). It is notified that the reset circuit 106 may be configured to reset the GOA circuit and thereby stabilize the GOA circuit to a great extent when the GOA circuit operates.

Figure 2:
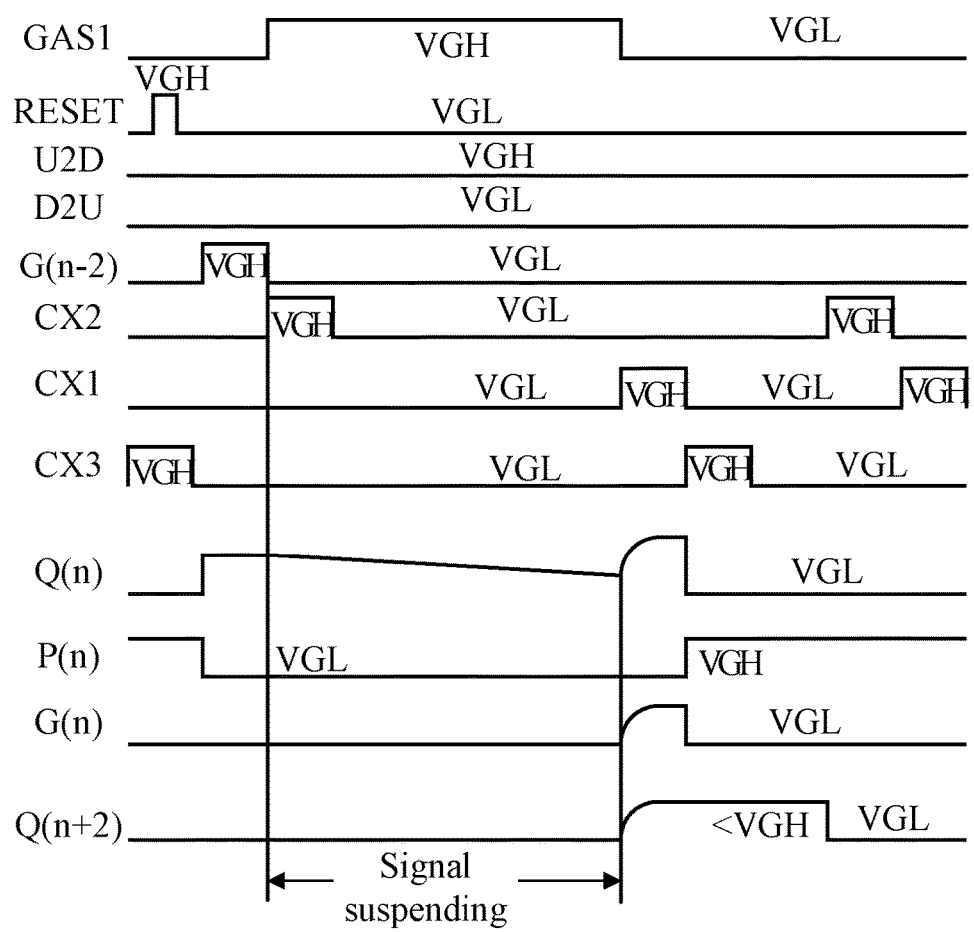
FIG. 2 illustrates a first timing diagram of signals applied on the GOA circuit according to the present disclosure.
Figure 3:
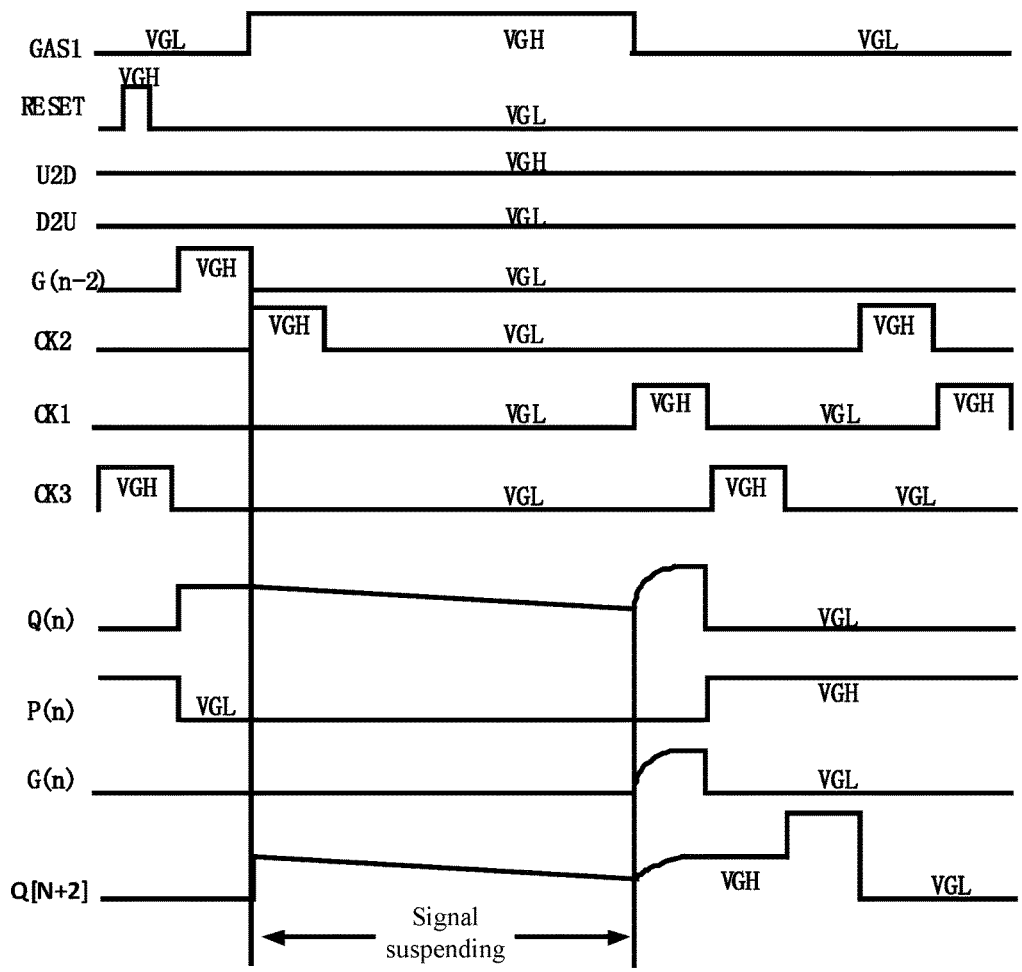
FIG. 3 illustrates a second timing diagram of signals applied on the GOA circuit according to the present disclosure.

For example, the GOA circuit proposed by the embodiment of the present disclosure is scanned forward. The working process of the GOA circuit is illustrated in FIG. 2 and FIG. 3. FIG. 2 is a first timing diagram of the GOA circuit proposed by the embodiment. FIG. 3 is a second timing diagram of the GOA circuit proposed by the embodiment.

When the in-cell touch display panel displays normally, the first controlling signal GAS1 is at low voltage level. When the in-cell touch display panel is under the stage of signal suspending and touch scanning, the first controlling signal GAS1 is at high voltage level. When the GOA circuit is positively scanned, the forward-scanning direct current controlling signal U2D is at high voltage level and the reverse-scanning direct current controlling signal D2U is at low voltage level. When the GOA circuit is reversely scanned, the forward-scanning direct current controlling signal U2D is at low voltage level and the reverse-scanning direct current controlling signal D2U is at high voltage level.

When the GOA circuit operates, at first, the scanning signal G(n−2) of the (n−2)th stage GOA unit circuit is at high voltage level; the third TFT T3 is turned on; the forward-scanning direct current controlling signal U2D at high voltage level outputs the first node controlling signal through the first node Q(n) of the third TFT T3; the first node controlling signal at high voltage level is stored in the first capacitor C1. Meanwhile, the fifth TFT T5 is turned on. The constant-voltage low voltage level VGL outputs the second node controlling signal through the second node P(n) of the fifth TFT T5. The second node controlling signal at low voltage level is stored in the second capacitor C2.

The in-cell touch display panel is under the stage of signal suspending and touch scanning. The first node controlling signal keeps high voltage level. The second node controlling signal keeps low voltage level. The first clock signal CK1 outputs low voltage level. Meanwhile, the tenth TFT T10 is turned on. The low voltage level of the first clock signal CK1 is output to the output terminal of the output circuit 103 through the tenth TFT T10. The scanning signal G(n) is at low voltage level.

It is notified that, as FIG. 2 illustrates, when the in-cell touch display panel is under the stage of signal suspending and touch scanning, the first node controlling signal on the first node Q(n) of the nth stage GOA unit circuit needs to stay high voltage level. But at this time, the reverse-scanning direct current controlling signal D2U is at low voltage level, and high voltage level stored in the first node controlling signal will leak electricity to the reverse-scanning direct current controlling signal D2U and the constant-voltage low voltage level VGL. In addition, the electricity of the TFT is not stable. When the TFT leaks a larger amount of current, the electric charge of the first node controlling signal leaks a larger amount of electricity. After the in-cell touch display panel is under the stage of signal suspending and touch scanning, the voltage level of the first node controlling signal is lower. Accordingly, the tenth TFT T10 fails to be turned on completely, further causing the scanning signal G(n) output by the nth stage GOA unit circuit to delay more obviously or causing the amplitude of the waveform to be lower than the constant-voltage high voltage level VGH. Further, when the scanning signal G(n) output by the nth stage GOA unit circuit is abnormal, the first node controlling signal on the first node Q(n+2) of the (n+2)th stage GOA unit circuit cannot be raised to the constant-voltage high voltage level VGH successfully, which causes the scanning signal G(n+2) output by the (n+2)th stage GOA unit circuit to be abnormal. Accordingly, the GOA circuit is ineffective, and the in-cell touch display panel displays abnormally.

A pre-charging circuit 105 is arranged when the in-cell touch display panel is under the stage of signal suspending and touch scanning. After the in-cell touch display panel is under the stage of signal suspending and touch scanning, the first node controlling signal on the first node Q(n+2) of the (n+2)th stage GOA unit circuit is pre-charged so that the first node controlling node on the (n+2)th stage GOA unit circuit can be charged to the constant-voltage high voltage level VGH, which reduces the risk of cascade failure for the GOA circuit and enhances the stability of the GOA circuit.

Specifically, as FIG. 3 illustrates, when the in-cell touch display panel is under the stage of signal suspending and touch scanning, the first controlling signal GAS1 outputs high voltage level. The first TFT T1 and the second TFT T2 are turned on. The first node controlling signal on the first node Q(n) of the nth stage GOA unit circuit pre-charges the first node controlling signal on the (n+2)th stage GOA unit circuit so that the (n+2)th stage GOA unit circuit can output the scanning signal G(n+2) normally. In this way, the risk of cascade failure for the GOA circuit, and the GOA circuit is stabilized to a great degree.

Subsequently, after the in-cell touch display panel finishes the touch scanning once, the first clock signal CK1 is at high voltage level, and the node controlling signal on the first node Q(n) is bootstrapped to a higher voltage level. Meanwhile, the second controlling signal on the second node P(n) keep constant-voltage low voltage level VGL. The scanning signal G(n) of the nth GOA unit circuit is at high voltage level.

At last, the third clock signal CK3 keeps high voltage level. The third clock signal CK3 pulls the first node controlling signal on the first node Q(n) down to the constant-voltage low voltage level VGL and raises the second node controlling signal on the second node P(n) to the constant-voltage high voltage level VGH. The scanning signal G(n) of the nth stage GOA unit circuit keeps low voltage level.

Figure 4:
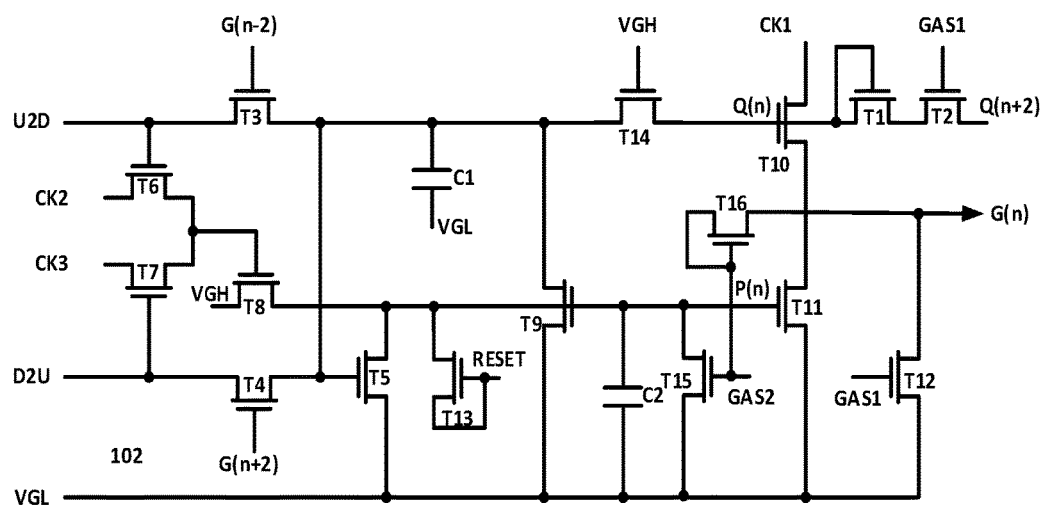
FIG. 4 illustrates a circuit diagram of a gate driver on array (GOA) circuit according to a second embodiment of the present disclosure.

Please refer to FIG. 4 illustrating a circuit diagram of a gate driver on array (GOA) circuit according to a second embodiment of the present disclosure. Differing from the GOA circuit in FIG. 1, the GOA circuit in FIG. 4 further includes a fourteenth thin-film transistor (TFT) T14, a fifteenth TFT T15, and a sixteenth TFT T16.

A source of the fourteenth TFT T14 is connected to a drain of the third TFT T3. A gate of the fourteenth TFT T14 receives a constant-voltage high voltage level VGH. A drain of the fourteenth TFT T14 is connected to a first node Q(n).

A source of the fifteenth TFT T15 receives a constant-voltage low voltage level VGL. A gate of the fifteenth TFT T15 receives a second controlling signal GAS2. A drain of the fifteenth TFT T15 is connected to a second node P(n).

A source and a gate of the sixteenth TFT T16 are both receive the second controlling signal GAS2. A drain of the sixteenth TFT T16 is connected to a drain of a tenth TFT T10.

It is notified that the gate of the fourteenth TFT T14 receives the constant-voltage high voltage level VGH when the GOA circuit operates to force the fourteenth TFT T14 to stay turned on.

The gate of the fifteenth TFT T15 and the gate of the sixteenth TFT T16 both receive the second controlling signal GAS2 at constant-voltage low voltage level VGL when the GOA circuit operates to force the fifteenth TFT T15 and the sixteenth TFT T16 to stay turned off.

In addition, the voltage level of the signal received by the gate of the fourteenth TFT T14, the gate of the fifteenth TFT T15, and the gate of the sixteenth TFT T16 can be further adjusted according to practical demand in the GOA circuit to control the fourteenth TFT T14, the gate of the fifteenth TFT T15, and the gate of the sixteenth TFT T16. In this way, the GOA circuit can be more flexibly used.

According the present disclosure, a pre-charging circuit is arranged on an nth stage GOA unit circuit of the GOA circuit. A first node controlling signal on a first node of an (n+2)th stage GOA unit circuit is pre-charged, reducing a risk of failure of stage-by-stage signal transmitting arising from poor holding voltage of the GOA unit circuit during the signal suspending and improving reliability of the GOA circuit.

Further, an in-cell touch display panel is proposed in another embodiment of the present disclosure. The in-cell touch display panel includes a gate driver on array (GOA) circuit like the GOA circuit detailed above, which can be referred freely.

According the present disclosure, a pre-charging circuit is arranged on an nth stage GOA unit circuit of the GOA circuit and the in-cell touch display panel. A first node controlling signal on a first node of an (n+2)th stage GOA unit circuit is pre-charged, reducing a risk of failure of stage-by-stage signal transmitting arising from poor holding voltage of the GOA unit circuit during the signal suspending and improving reliability of the GOA circuit.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A gate driver on array (GOA) circuit, applying to an in-cell touch display panel, comprising:
   a plurality of cascaded GOA unit circuits; an nth stage GOA unit circuit comprising: a forward/reverse-scanning controlling circuit, a node controlling circuit, an output circuit, an output controlling circuit, and a pre-charging circuit;
   the forward/reverse-scanning controlling circuit, configured to output a first node controlling signal at a first node and a second node controlling signal at a second node according to a forward-scanning direct current controlling signal and a reverse-scanning direct current controlling signal;

the node controlling circuit, coupled to the first node and the second node, and configured to pull the first node controlling signal down to a constant-voltage low voltage level and raise the second node controlling signal to a constant-voltage high voltage level;

the output circuit, coupled to the first node and electrically connected to a first clock signal, and configured to output a scanning signal according to the first node controlling signal and the first clock signal;

the output controlling circuit, electrically connected to the first controlling signal and configured to pull the scanning signal down to the constant-voltage low voltage level according to the first controlling signal;

the pre-charging circuit, coupled to the first node and electrically connected to the first node of an (n+2)th stage GOA unit circuit, configured to pre-charge the first node controlling signal on the first node of the (n+2)th stage GOA unit circuit when the in-cell touch display panel is under a stage of signal suspending and touch scanning;

the pre-charging circuit comprises a first third thin-film transistor (TFT) and a second TFT;

a gate and a source of the first TFT being both connected to the first node; a drain of the first TFT being connected to a source of the second TFT, a drain of the second TFT being connected to the first node of the (n+2)th stage GOA unit circuit; a gate of the second TFT receiving the first controlling signal;

when the in-cell touch display panel displays normally, the first controlling signal being at a low voltage level; when the in-cell touch display panel is under the stage of signal suspending and touch scanning, the first controlling signal being at a high voltage level.

2. The GOA circuit of claim 1, wherein the forward/reverse-scanning controlling circuit comprises a third TFT, a fourth TFT, a fifth TFT, a first capacitor, and a second capacitor;

a source of the third TFT receives the forward-scanning direct current controlling signal; a gate of the third TFT receives the scanning signal of an (n−2)th stage GOA unit circuit; a drain of the third TFT is connected to the first node, a drain of the fourth TFT, and the gate of the fifth TFT;

a source of the fourth TFT receives the reverse-scanning direct current controlling signal; a gate of the fourth TFT receives the scanning signal of the (n+2)th stage GOA unit circuit;

a source of the fifth TFT receives the constant-voltage low voltage level; a drain of the fifth TFT is connected to the second node;

a terminal of the first capacitor is connected to the first node; the other terminal of the first capacitor receives the constant-voltage low voltage level;

a terminal of the second capacitor is connected to the second node; the other terminal of the second capacitor receives the constant-voltage low voltage level.

3. The GOA circuit of claim 1, wherein the node controlling circuit comprises a sixth TFT, a seventh TFT, an eighth TFT, and a ninth TFT;

a source of the sixth TFT receives a second clock signal; a gate of the sixth TFT receives the forward-scanning direct current controlling signal; a drain of the sixth TFT is connected to a gate of the eighth TFT;

a source of the seventh TFT receives a third clock signal; a gate of the seventh TFT receives the reverse-scanning direct current controlling signal; a drain of the seventh TFT is connected to the gate of the eighth TFT;

a source of the eighth TFT receives the constant-voltage high voltage level; a drain of the eighth TFT is connected to the second node;

a source of the ninth TFT receives the constant-voltage low voltage level; a gate of the ninth TFT is connected to the second node; a drain of the ninth TFT is connected to the first node.

4. The GOA circuit of claim 1, wherein the output circuit comprises a tenth TFT;

a source of the tenth TFT receives the first clock signal; a gate of the tenth TFT is connected to the first node; a drain of the tenth TFT is connected to an output terminal of the output circuit.

5. The GOA circuit of claim 1, wherein the output controlling circuit comprises an eleventh TFT and a twelfth TFT;

a source of the eleventh receives the constant-voltage low voltage level; a gate of the eleventh TFT is connected to the second node; a drain of the eleventh TFT is connected to the output terminal of the output circuit;

a source of the twelfth TFT receives the constant-voltage low voltage level; a gate of the twelfth TFT receives the first controlling signal; a drain of the twelfth TFT is connected to the output terminal of the output circuit.

6. The GOA circuit of claim 1, wherein the nth stage GOA unit circuit further comprises a reset circuit; the reset circuit comprises a thirteenth TFT; a source and a drain of the thirteenth TFT both receive a reset signal; a drain of the thirteenth TFT is electrically connected to the second node.

7. The GOA circuit of claim 1, wherein the forward-scanning direct current controlling signal is at high voltage level, and the reverse-scanning direct current controlling signal is at low voltage level when the GOA circuit is scanned forwardly; the forward-scanning direct current controlling signal is at low voltage level, and the reverse-scanning direct current controlling signal is at high voltage level when the GOA circuit is scanned reversely.

8. A gate driver on array (GOA) circuit, applying to an in-cell touch display panel, comprising:

a plurality of cascaded GOA unit circuits; an nth stage GOA unit circuit comprising: a forward/reverse-scanning controlling circuit, a node controlling circuit, an output circuit, an output controlling circuit, and a pre-charging circuit;

the forward/reverse-scanning controlling circuit, configured to output a first node controlling signal at a first node and a second node controlling signal at a second node according to a forward-scanning direct current controlling signal and a reverse-scanning direct current controlling signal;

the node controlling circuit, coupled to the first node and the second node, and configured to pull the first node controlling signal down to a constant-voltage low voltage level and raise the second node controlling signal to a constant-voltage high voltage level;

the output circuit, coupled to the first node and electrically connected to a first clock signal, and configured to output a scanning signal according to the first node controlling signal and the first clock signal;

the output controlling circuit, electrically connected to the first controlling signal and configured to pull the scanning signal down to the constant-voltage low voltage level according to the first controlling signal;

the pre-charging circuit, coupled to the first node and electrically connected to the first node of an (n+2)th stage GOA unit circuit, configured to pre-charge the first node controlling signal on the first node of the (n+2)th stage GOA unit circuit when the in-cell touch display panel is under a stage of signal suspending and touch scanning.

9. The GOA circuit of claim 8, wherein the pre-charging circuit comprises a first third thin-film transistor (TFT) and a second TFT;

a gate and a source of the first TFT being both connected to the first node; a drain of the first TFT being connected to a source of the second TFT, a drain of the second TFT being connected to the first node of the (n+2)th stage GOA unit circuit; a gate of the second TFT receiving the first controlling signal.

10. The GOA circuit of claim 8, wherein the forward/reverse-scanning controlling circuit comprises a third TFT, a fourth TFT, a fifth TFT, a first capacitor, and a second capacitor;

a source of the third TFT receives the forward-scanning direct current controlling signal; a gate of the third TFT receives the scanning signal of an (n−2)th stage GOA unit circuit; a drain of the third TFT is connected to the first node, a drain of the fourth TFT, and the gate of the fifth TFT;

a source of the fourth TFT receives the reverse-scanning direct current controlling signal; a gate of the fourth TFT receives the scanning signal of the (n+2)th stage GOA unit circuit;

a source of the fifth TFT receives the constant-voltage low voltage level; a drain of the fifth TFT is connected to the second node;

a terminal of the first capacitor is connected to the first node; the other terminal of the first capacitor receives the constant-voltage low voltage level;

a terminal of the second capacitor is connected to the second node; the other terminal of the second capacitor receives the constant-voltage low voltage level.

11. The GOA circuit of claim 8, wherein the node controlling circuit comprises a sixth TFT, a seventh TFT, an eighth TFT, and a ninth TFT;

a source of the sixth TFT receives a second clock signal; a gate of the sixth TFT receives the forward-scanning direct current controlling signal; a drain of the sixth TFT is connected to a gate of the eighth TFT;

a source of the seventh TFT receives a third clock signal; a gate of the seventh TFT receives the reverse-scanning direct current controlling signal; a drain of the seventh TFT is connected to the gate of the eighth TFT;

a source of the eighth TFT receives the constant-voltage high voltage level; a drain of the eighth TFT is connected to the second node;

a source of the ninth TFT receives the constant-voltage low voltage level; a gate of the ninth TFT is connected to the second node; a drain of the ninth TFT is connected to the first node.

12. The GOA circuit of claim 8, wherein the output circuit comprises a tenth TFT;

a source of the tenth TFT receives the first clock signal; a gate of the tenth TFT is connected to the first node; a drain of the tenth TFT is connected to an output terminal of the output circuit.

13. The GOA circuit of claim 8, wherein the output controlling circuit comprises an eleventh TFT and a twelfth TFT;

a source of the eleventh receives the constant-voltage low voltage level; a gate of the eleventh TFT is connected to the second node; a drain of the eleventh TFT is connected to the output terminal of the output circuit;

a source of the twelfth TFT receives the constant-voltage low voltage level; a gate of the twelfth TFT receives the first controlling signal; a drain of the twelfth TFT is connected to the output terminal of the output circuit.

14. The GOA circuit of claim 8, wherein the nth stage GOA unit circuit further comprises a reset circuit; the reset circuit comprises a thirteenth TFT; a source and a drain of the thirteenth TFT both receive a reset signal; a drain of the thirteenth TFT is electrically connected to the second node.

15. The GOA circuit of claim 8, wherein when the in-cell touch display panel displays normally, the first controlling signal being at a low voltage level; when the in-cell touch display panel is under the stage of signal suspending and touch scanning, the first controlling signal being at a high voltage level.

16. The GOA circuit of claim 8, wherein the forward-scanning direct current controlling signal is at high voltage level, and the reverse-scanning direct current controlling signal is at low voltage level when the GOA circuit is scanned forwardly; the forward-scanning direct current controlling signal is at low voltage level, and the reverse-scanning direct current controlling signal is at high voltage level when the GOA circuit is scanned reversely.

17. An in-cell touch display panel comprising a gate driver on array (GOA) circuit, the GOA circuit comprising:

a plurality of cascaded GOA unit circuits; an nth stage GOA unit circuit comprising: a forward/reverse-scanning controlling circuit, a node controlling circuit, an output circuit, an output controlling circuit, and a pre-charging circuit;

the forward/reverse-scanning controlling circuit, configured to output a first node controlling signal at a first node and a second node controlling signal at a second node according to a forward-scanning direct current controlling signal and a reverse-scanning direct current controlling signal;

the node controlling circuit, coupled to the first node and the second node, and configured to pull the first node controlling signal down to a constant-voltage low voltage level and raise the second node controlling signal to a constant-voltage high voltage level;

the output circuit, coupled to the first node and electrically connected to a first clock signal, and configured to output a scanning signal according to the first node controlling signal and the first clock signal;

the output controlling circuit, electrically connected to the first controlling signal and configured to pull the scanning signal down to the constant-voltage low voltage level according to the first controlling signal;

the pre-charging circuit, coupled to the first node and electrically connected to the first node of an (n+2)th stage GOA unit circuit, configured to pre-charge the first node controlling signal on the first node of the (n+2)th stage GOA unit circuit when the in-cell touch display panel is under a stage of signal suspending and touch scanning.

18. The in-cell touch display panel of claim 17, wherein the pre-charging circuit comprises a first third thin-film transistor (TFT) and a second TFT;

a gate and a source of the first TFT being both connected to the first node; a drain of the first TFT being connected to a source of the second TFT, a drain of the second TFT being connected to the first node of the (n+2)th stage GOA unit circuit; a gate of the second TFT receiving the first controlling signal.

19. The in-cell touch display panel of claim 17, wherein when the in-cell touch display panel displays normally, the first controlling signal being at a low voltage level; when the in-cell touch display panel is under the stage of signal suspending and touch scanning, the first controlling signal being at a high voltage level.

20. The in-cell touch display panel of claim 17, wherein the forward-scanning direct current controlling signal is at high voltage level, and the reverse-scanning direct current controlling signal is at low voltage level when the GOA circuit is scanned forwardly; the forward-scanning direct current controlling signal is at low voltage level, and the reverse-scanning direct current controlling signal is at high voltage level when the GOA circuit is scanned reversely.

* * * * *